United States Patent [19]
Mueller, Jr.

[11] B 3,917,002
[45] Nov. 4, 1975

[54] DRAFT CONTROL LINKAGE FOR A TRACTOR

[75] Inventor: Otto Mueller, Jr., Detroit, Mich.

[73] Assignee: Massey-Ferguson Inc., Detroit, Mich.

[22] Filed: July 9, 1973

[21] Appl. No.: 377,869

[44] Published under the Trial Voluntary Protest Program on January 28, 1975 as document no. B 377,869.

Related U.S. Application Data

[63] Continuation of Ser. No. 189,662, Oct. 15, 1971, abandoned.

[52] U.S. Cl. .................................................... 172/9
[51] Int. Cl.² ......................................... A01B 63/112
[58] Field of Search ........................ 172/4, 7, 9, 10

[56] References Cited
UNITED STATES PATENTS

| | | |
|---|---|---|
| 2,921,638 | 1/1960 | DuShane ................................. 172/9 |
| 3,120,278 | 2/1964 | Ashfield et al. ........................ 172/9 |
| 3,194,319 | 7/1965 | Faupe ..................................... 172/9 |
| 3,314,484 | 4/1967 | Bunting et al. ......................... 172/9 |
| 3,331,447 | 7/1967 | Simak ..................................... 172/9 |
| 3,409,087 | 11/1968 | Schneider .............................. 172/7 |

Primary Examiner—Stephen C. Pellegrino

[57] ABSTRACT

A control for a tractor draft linkage has a control valve operated by a linkage between raise, neutral and lower conditions that includes a first follow-up system responsive to the changes in draft loads on the linkage to maintain a variable predetermined draft load and a second follow-up system responsive to the linkage position to limit the maximum depth of the implement to a variable predetermined level. Another system is responsive to the linkage position to condition the valve for neutral operation when the linkage reaches a predetermined maximum height.

5 Claims, 8 Drawing Figures

DRAFT CONTROL LINKAGE FOR A TRACTOR

RELATED APPLICATIONS

This is a continuation of my application Ser. No. 189,662 filed on Oct. 15, 1971 now abandoned and entitled "Draft Control Linkage For Tractor".

FIELD OF THE INVENTION

This invention relates to tractors of the type equipped with a power elevatable implement hitch linkage and it is more particularly concerned with an improved automatic control for the linkage.

BACKGROUND OF THE INVENTION

Most wheeled tractors, particularly of the agricultural type, utilize a elevatable power three-point hitch for coupling the tractor to implements carried behind the tractor. There generally is a draft sensing means which measures the draft load between the implement and the tractor and which acts through the control system to raise or lower the linkage and the implement so as to maintain a constant draft load. In addition to measuring the draft forces it has become common to utilize the vertical position of the implement as a controlling factor also. This position control may be independent of the draft control or may function simultaneously therewith.

In order to prevent a mounted implement such as a plow from entering too far into the ground upon initial lowering of the implement or other conditions of operation, it is desirable to establish a maximum depth to which the implement can be lowered during operation. It is also desirable to be able for the operator to vary this maximum depth at will. It is also desirable that the raising of the hitch be automatically stopped when it has reached a predetermined height or implement transport position so as to unload the hydraulic system to minimize power loss and excessive heating of the hydraulic fluid caused by constant pumping.

OBJECTS OF THE INVENTION

It is therefore an object of the invention to provide a control system for a hydraulically operated hitch on a tractor wherein the raising and lowering of the hitch is controlled by the changes in the draft forces on the hitch from a variable operator set value.

The control system has a draft measuring device which is operable through connecting linkage on a control valve to control the raising and lowering of the linkage. A second operator set control is responsive to changes in the vertical position of the hitch and will determine the lowest position to which the draft control can cause the implement to fall.

It is a further object of the invention to provide a hitch position sensing member that will positively act on a control valve to positively stop the raising of the tractor hitch when it reaches a predetermined height.

This and other objects and advantages will be apparent from the following specification and attached drawings.

BRIEF DESCRIPTION OF THE DRAWINGS

FIG. 3 is a perspective view of the linkage which interconnects a draft sensing unit, the operator controls, a position sensing unit and the control valve;

DETAILED DESCRIPTION

Figure 1:
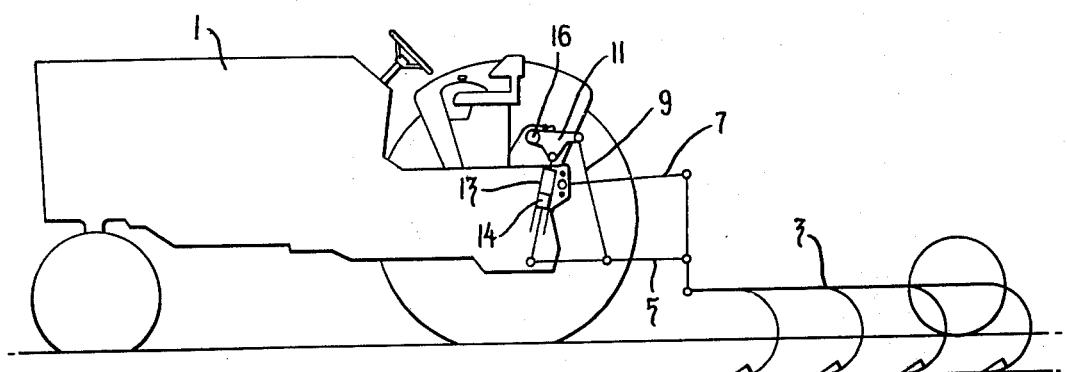
FIG. 1 is an outline of a tractor and hitch and implement combination on which the invention can be applied.

Referring now to the drawings:

FIG. 1 shows a tractor 1 coupled by a hitch or draft linkage to an implement 3. The hitch includes a pair of lower links 5, only one of which is shown, and a top link 7. The links 5 and 7 together comprise a conventional three-point hitch. The lower links 5 are raised by lift links 9 connected to a lift arm 11 secured to a rockshaft 16. The arm 11 is raised by means of a hydraulic unit including a piston 14 operating in a cylinder 13.

The mechanism for controlling the hydraulic means 13–14, and thus the raising and lowering of the linkage, is diagrammatically shown in FIG. 3. Included is a valve V having an inlet 42 connected to a suitable source of pressure, an outlet 44 connected to the hydraulic cylinders 14 and an exhaust or relief 46. The details of the valve V form no part of the invention. The valve V may be of any conventional type and is operated by a plunger shaft 41 which engages a bell crank 43 pivoted on a fixed shaft 45. One arm of the bell crank 43 carries, by means of a ball joint, a link 47 which itself is connected at its other end by a ball joint to a second bell crank 49 pivoted on a fixed shaft 51. Movement of the bell crank 49 about the shaft 51 causes corresponding movement of the bell crank 43 about the shaft 45.

Figure 2:
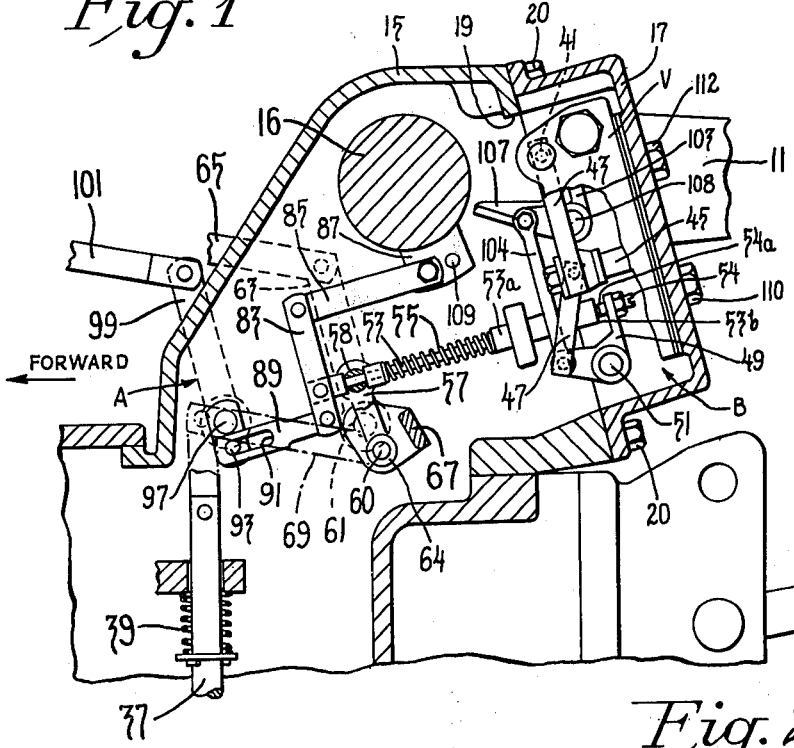
FIG. 2 is a cross-sectional view through the portion of the tractor and linkage showing a control linkage which operates the hydraulic control valve to control the hitch.

The bell crank 49 is connected to a control rod 53. A forked operating lever 57 acts against a spring 55 which surrounds the control rod 53 and which bears against an enlarged portion 53a on the rod. Rotation of the arm 57 counterclockwise as viewed in FIGS. 2 and 3, causes spring 55 to urge the rod 53 rearward as viewed in the figures. The forked arm 57 has a trunnion 58 and is rotatably mounted on and secured to a shaft 60 which extends into and is carried in the legs of a cradle 67. The cradle 67 is supported on its legs by shafts 61 and 62 having a common axis 59. The shafts 61 and 62 extend through the side walls of the housing 15 on the tractor. The cradle 67 is secured to shaft 61 and therefore rotates therewith. The other end of the shaft 61 has a link 63 nonrotatably secured thereto. The link 63 in turn is pivoted to a link 65, connected to a quadrant lever, not shown.

Figure 4:
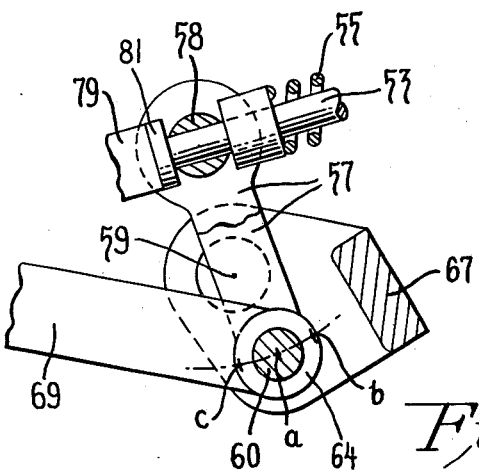
FIG. 4 is an enlarged view showing details of the portion of the control linkage.
Figure 5:
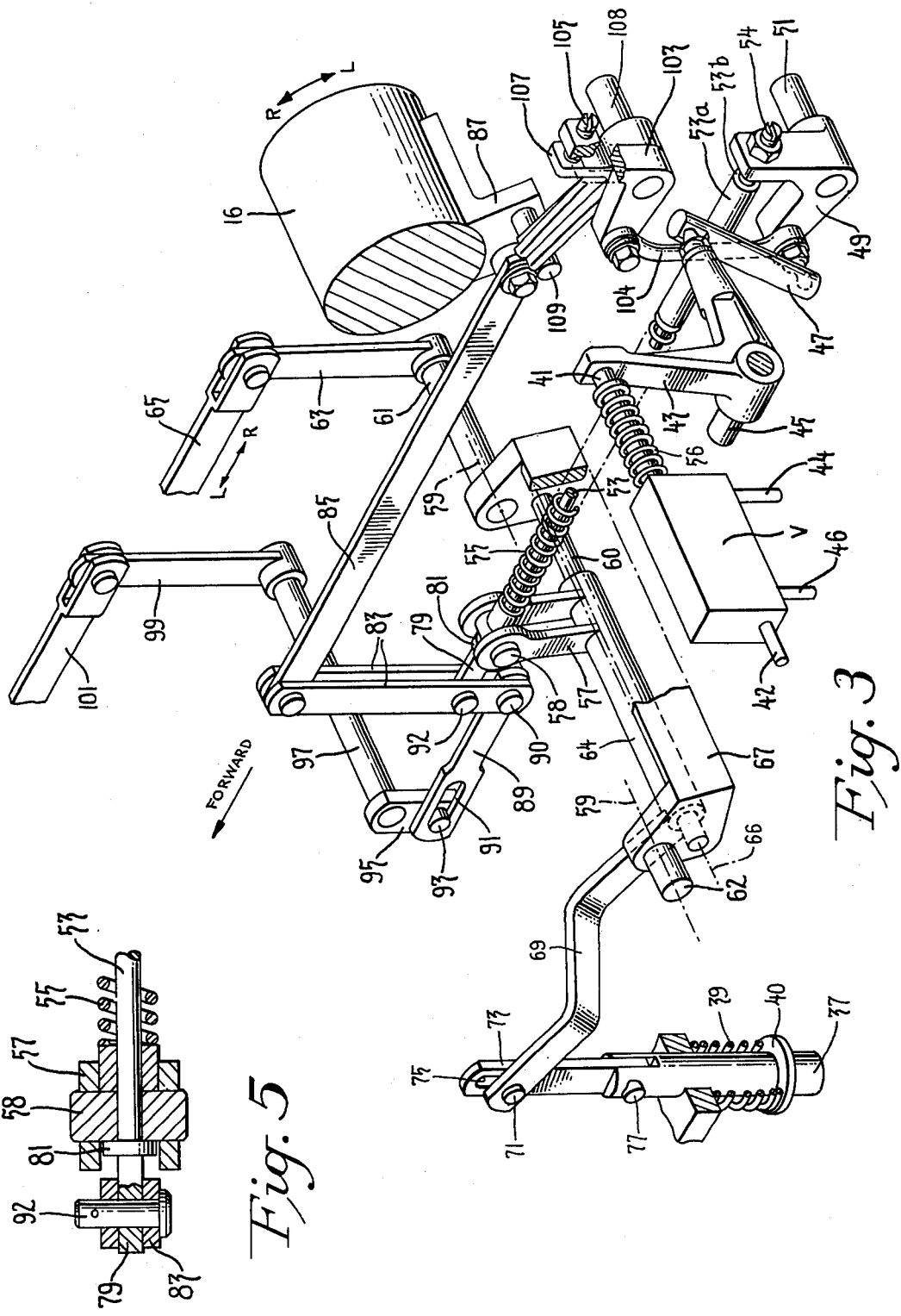
FIG. 5 is another enlarged view showing additional details of the control linkage.
Figure 6:
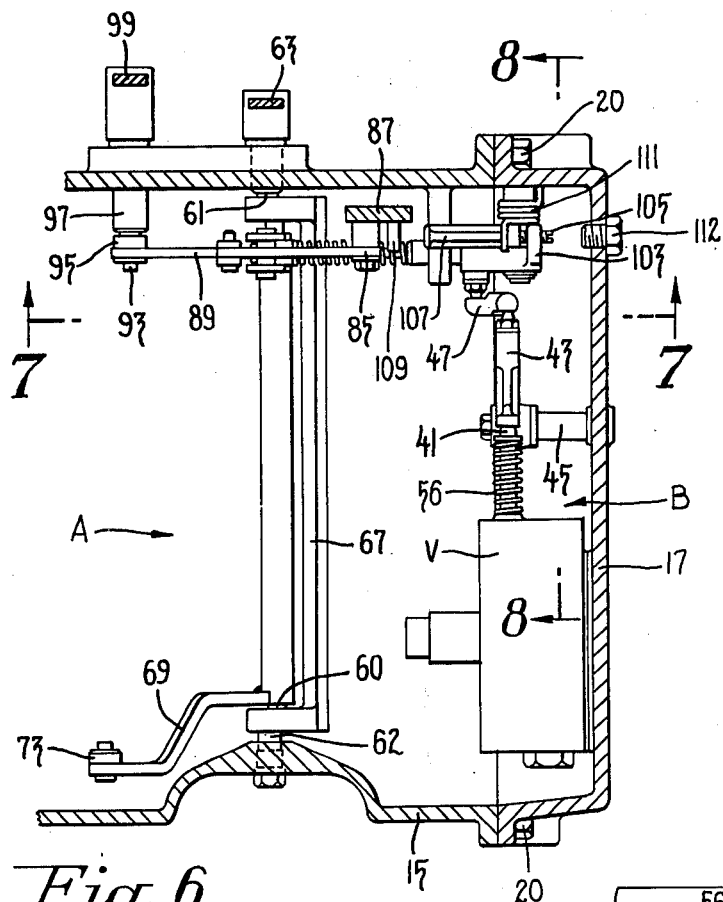
FIG. 6 is a sectional view of the control linkage as viewed from the top.
Figure 7:
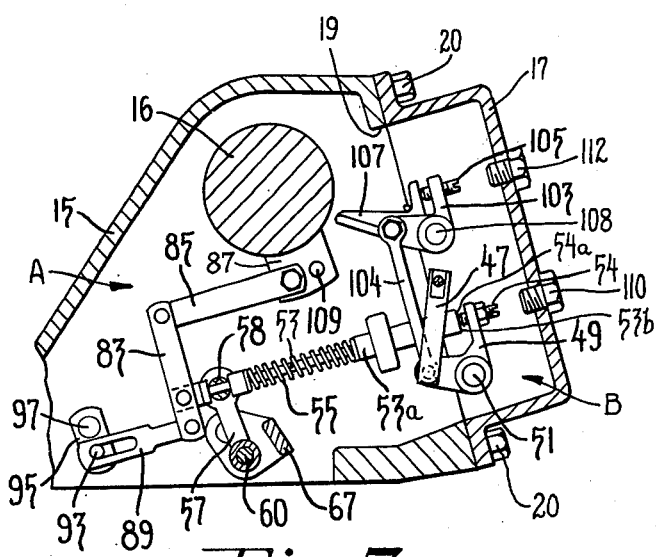
FIG. 7 is a cross-sectional view taken on the lines 7—7 of FIG. 6.
Figure 8:
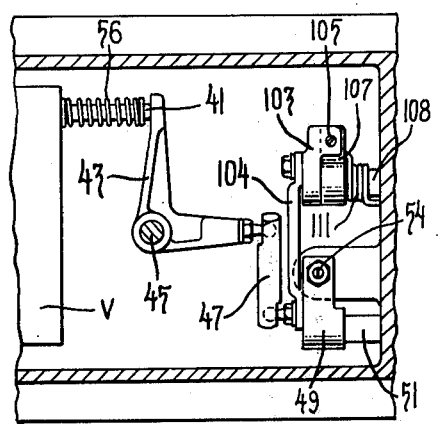
FIG. 8 is a sectional view taken on the line 8—8 of FIG. 6.

The position of the forked member 57 is controlled by the location of the axis of the shaft 60. In FIG. 4, the member 67 is shown at an intermediate position with the axis 66 of shafts 60 and 64 being at point *a*. By moving the link 65 to rotate the shaft 61 the shafts 60 and 64 can be swung about to point *b* or point *c*. In addition to the actual movement of the shafts 60 and 64, the shaft 64 can be rotated about the axis 66 by the arm 69 which is secured thereto. The arm 69 is connected by a pin 71 to a member or link 73. The pin 71 extends through a slot 75 in the member 73. Link 73 is connected by a pin 77 to a plunger 37 which is urged downward by a spring 39 bearing against a large portion 40 on the draft input member 37. Member 37 is connected to a draft sensing device (not shown) which can be of any suitable form but which measures the draft forces on the hitch. This may either be by measuring the force on the top link 7 or the lower links 5. The member 37 moves downward with increase in the draft load.

Control rod 53 has an extension 79 which is connected to a floating lever 83. The upper portion of the floating lever 83 is pivotally connected to a position sensitive link 85 which in turn is pivotally connected to a flange member 87 attached to the rockshaft 16. Movement of the rockshaft 16 during raising and lowering of the linkage is transmitted through the members 87 and 85 to the floating lever 83. The lower end of the lever 83 is pivotally connected to a link 89 which has a slot 91 formed therein to receive a pin 93 carried on the lower end of a link 95 that is secured to a shaft 97. The shaft 97 carries on its other end a link 99 secured thereto which can be rotated by a link 101, operated by a quadrant lever (not shown), suitably positioned for operation by the tractor operator.

The flange member 87 carried by the rockshaft 16 carries a pin 109 that acts to engage a bell crank member 107. The member 107 acts through an adjustable screw 105 against a second bell crank member 103 that is connected by a link 104 to the bell crank lever 49 that acts through the link 47 to urge the valve V to neutral position.

The operation of the control linkage is as follows: Assuming that the implement is in a raised condition and the operator wishes to lower the same, he operates his quadrant lever to control the draft setting. To lower the implement, link 65 is moved forward, as viewed in the figures, to cause the shaft 61 to rotate counterclockwise and thus rotate the cradle 67 counterclockwise about its axis 59. This will cause the shaft 60 carried in the member 67 to be moved rearward from position a to position b and simultaneously urge the control rod 53 rearward through the spring 55. This motion is transmitted through the bell crank lever 49, link 47 and bell crank 43 to the valve operating rod 41, to urge the valve against its spring, into a position to allow the implement to be lowered.

As the implement enters the ground, a draft force is exerted upon the linkage and this draft force will, as measured by the suitable measuring device, cause the draft input member 37 to be moved downward as viewed in the figures. This downward movement acts through the links 73, pin 71 and lever 69 to rotate the shaft 64 counterclockwise acting to relieve the force through spring 55 on the member 53 to gradually allow the valve V to close. When the draft forces have increased, due to the lowering of the implement into the ground, to a point, as predetermined by the setting of the lever 65, member 60 will have moved sufficiently to cause the member 57 to return to the position a, shown in FIG. 4, which represents a neutral position wherein oil is neither flowing into or out of the cylinders.

Prior to lowering of the implement, the operator has preconditioned the lever 101 to a position corresponding to the maximum depth at which he wishes the implement to operate. This acts through the links 99, 95, pin 93 and link 89 to locate the lower pin 90 of the floating lever 83. As the implement is lowered, the rockshaft 16 rotates clockwise, as viewed in the figures, causing the lever 85 to move forward. Through the intermediate pin 92 the extension 79 on the control rod 53 is moved forward and when the minimum depth selected by the operator is reached, the valve will be in a neutral position wherein oil is neither flowing into or out of the cylinders. It thus can be seen that both the draft force on the hitch and the position of the hitch affect the operation of the valve. The position control acts merely as a limit to the depth, whereas the draft control acts as a constant control over the depth of the implement. In effect the position control acts as a variable stop through the medium of pin 93, to limit the rearward movement of the control rod 53, and upon reaching the predetermined depth causes the control rod to move to its neutral valve position.

As the draft forces change during operation of the implement, the draft sensitive member 37 moves up and down to cause the lever 69 to rotate the shaft 60 and to operate the control rod 53. Control of the valve to open and close to raise and lower the implement to maintain a constant draft force is thus predetermined by the setting of the lever 65. If the position floor, as set by lever 101, is such that the valve is returned to neutral before the depth is reached that would produce the draft force acting through the member 37 sufficient to move the valve to a neutral position, the rod 53 will be moved to the left away from the floating member 57 and the spring 55 will be compressed.

When the operator wishes to raise the implement out of the ground, he operates the lever 65 rearward, as viewed in the figures, to cause the shaft 61 to rotate clockwise which causes forward movement of the forked member 57 thereby moving the control rod 53 forward and through the bell crank 49, lever 47 and bell crank 43, permit the valve to be moved to its raised position allowing oil to flow into the cylinders raising the implement. As the implement is raised, the rockshaft 16 rotates counterclockwise, and when a maximum transport position is reached the pin 109 engages the arm of the bell crank 107. This action through the adjustable screw 105, urges the bell crank 103 clockwise to raise the lever 104 and cause the bell crank 43 to move the valve control rod 41 to its neutral position cutting off the flow to the cylinders and hence the raising of the implement.

The slot 91 in the lever 89 permits the position control linkage to operate during the normal operation, i.e., allowing the link 85 to move back and forth to pivot the floating lever 83 about pin 92 and cause link 89 to move back and forth with the pin 93 in the slot 91. Movement of the lever 89 rearward is restricted by the position of the pin 93 as set by the lever 101, but movement of the lever forward is unrestricted. The slot 75 in the lever 73 performs a similar function in that it permits the lever 69 to move upward with the pin 71 moving in the slot 75.

It will be seen that the control linkage for a tractor that will permit the operator to establish whatever draft force he wishes without interference of a position control. At the same time he can establish the maximum depth that the implement will operate. This is particularly important to prevent the implement from going too deep into the ground upon originally entering the ground, wherein the front portion such as the plow bottoms do not provide sufficient draft force in themselves to cause the mechanism to stop the lowering of the implement and the subsequent entering of the rear portion of the implement has not had the effect on the draft responsive member that it will have when the implement reaches its proper depth. By being able to establish the floor or minimum position to which the implement will go, the operator can insure that the implement will not be too deep into the ground.

I claim:

1. In a tractor having draft linkage for connecting the tractor to an implement, hydraulic means including valve means for controlling the vertical position of the draft linkage, draft sensing means for measuring changes in draft loads in the draft linkage, means for operating the valve means in accordance with changes in the draft loads to condition the valve means to raise, hold or lower the implement, operator-set draft input means, a draft control linkage interconnecting the draft sensing means, the operator set draft input means and the valve operating means so that changes in draft forces in the draft linkage from a value set by the operator-set draft input means will condition the valve means to hold or lower the linkage to establish and maintain said set value, the valve operating means including a reciprocable control rod operatively connected to the valve means characterized by said draft control linkage comprising a first member pivotable about a first fixed axis by said operator set draft input means, a second member operatively connected to the control rod and pivotally mounted on said first member on a second movable axis spaced from the fixed axis, said draft sensing means operatively connected to the second member to rotate it about the second axis.

2. In a tractor as set forth in claim 1 further characterized by the first member being a cradle with legs and a third member spaced from said fixed axis, the second member being pivotally mounted on said third member.

3. In a tractor having draft linkage for connecting the tractor to an implement, hydraulic means including valve means for controlling the vertical position of the draft linkage, draft sensing means for measuring changes in draft loads in the draft linkage, means for operating the valve means in accordance with changes in the draft loads to condition the valve means to raise, hold or lower the implement, operator-set draft input means, a draft control linkage interconnecting the draft sensing means, the operator set draft input means and the valve operating means so that change in draft forces in the draft linkage from a value set by the operator-set draft input means will condition the valve means to hold or lower the linkage to establish and maintain said set value, second operator-set maximum depth position input means, position sensitive means responsive to the vertical position of the draft linkage, the valve operating means including a control rod characterized by a floating lever pivotally connected to the control rod at a first location, the position sensitive means pivotally connected to the lever at a second location and the second operator-set maximum depth means connected to the floating lever at a third location.

4. In a tractor as set forth in claim 3 further characterized by the second and third locations at opposite ends of the floating lever and the first location is intermediate the ends.

5. A tractor having draft linkage for connecting the tractor to an implement, hydraulic means including valve means for controlling the vertical position of the draft linkage, draft sensing means for measuring changes in draft loads in the linkage, a housing on the tractor, control means for the hydraulic means within the housing, said housing including side walls and a rear wall, said control means including a control valve mounted on the rear wall, a first lever pivoted on one of the side walls, linkage interconnecting the first lever and the control valve, a control rod connected to the first lever, a control member extending between the side walls and supported on first and second coaxial shafts and secured to rotate with at least one of said shafts extending through said walls, a second lever outside of said housing connected to rotate on said first shaft, a third cross shaft carried by said control member and pivotably mounted thereon on an axis spaced from the axis of said first and second coaxial shafts, third lever means secured to said cross shaft and engaging said control rod through resilient means, first condition sensing means in said housing also secured to said cross shaft to rotate the same on its axis, a fourth floating lever means pivotally carried on a point intermediate its ends on the control rod, a fourth shaft extending through a wall of the housing, a fifth lever on the exterior of said housing secured to the fourth shaft, a sixth lever secured to the fourth shaft inside the housing, linkage connecting said sixth lever to the fourth floating lever at one end thereof, a second condition sensing means within the housing and linkage connecting the second condition sensing means to the other end of the fourth floating lever.

* * * * *